(12) United States Patent
Park et al.

(10) Patent No.: US 10,807,348 B2
(45) Date of Patent: Oct. 20, 2020

(54) SYSTEM FOR MANUFACTURING DISPLAY UNIT

(71) Applicant: LG CHEM, LTD., Seoul (KR)

(72) Inventors: San Park, Daejeon (KR); Hang Suk Choi, Daejeon (KR); Eung Jin Jang, Daejeon (KR); Suk Jae Lee, Daejeon (KR); Kyung Hyeok Park, Daejeon (KR); Bong Su Jeung, Daejeon (KR); Jea Han Ryoo, Daejeon (KR); Pil Soo Nam, Daejeon (KR); Beom Seok Lee, Daejeon (KR); Yu Jin Lim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 16/328,020

(22) PCT Filed: Jul. 17, 2017

(86) PCT No.: PCT/KR2017/007630
§ 371 (c)(1),
(2) Date: Feb. 25, 2019

(87) PCT Pub. No.: WO2018/038395
PCT Pub. Date: Mar. 1, 2018

(65) Prior Publication Data
US 2019/0193382 A1 Jun. 27, 2019

(30) Foreign Application Priority Data
Aug. 25, 2016 (KR) .......................... 10-2016-0108476

(51) Int. Cl.
*B32B 37/00* (2006.01)
*B65H 1/00* (2006.01)
(Continued)

(52) U.S. Cl.
CPC .......... *B32B 37/10* (2013.01); *B29D 11/0073* (2013.01); *B32B 7/12* (2013.01);
(Continued)

(58) Field of Classification Search
None
See application file for complete search history.

(56) References Cited

U.S. PATENT DOCUMENTS

2015/0190995 A1 7/2015 Kim et al.

FOREIGN PATENT DOCUMENTS

| CN | 101152931 A | 4/2008 |
| JP | 2002-357216 A | 12/2002 |

(Continued)

*Primary Examiner* — Linda L Gray
(74) *Attorney, Agent, or Firm* — Dentons US LLP

(57) ABSTRACT

Provided is a system for manufacturing a display unit, the system including: a carrying unit which carries an optical film including a polarizing film including an adhesive layer and a release film to which the polarizing film is bonded to be peeled off through the adhesive layer; a cutting unit which cuts the optical film by a predetermined depth, in which the release film is not cut, and forms a polarizing film sheet piece on the optical film; a peeling unit which peels the polarizing film sheet piece from the release film; and an attachment unit which attaches the polarizing film sheet piece peeled from the release film to a panel, in which the attachment unit includes: a pair of attachment rolls which presses and attaches the polarizing film sheet piece onto one surface of the panel; and a magnetic force generating unit or a suction part, which suppresses an upper attachment roll positioned at an upper side between the pair of attachment rolls from sagging by using magnetic force or suction.

12 Claims, 7 Drawing Sheets

(51) Int. Cl.
*B29D 11/00* (2006.01)
*B32B 38/00* (2006.01)
*G02F 1/00* (2006.01)
*B32B 37/10* (2006.01)
*B32B 7/12* (2006.01)
*B32B 37/12* (2006.01)
*B32B 37/18* (2006.01)
*B32B 38/18* (2006.01)
*G02F 1/13* (2006.01)

(52) U.S. Cl.
CPC .......... *B32B 37/0053* (2013.01); *B32B 37/12* (2013.01); *B32B 37/182* (2013.01); *B32B 38/0004* (2013.01); *B32B 38/1833* (2013.01); *B65H 1/00* (2013.01); *B32B 2037/1081* (2013.01); *B32B 2250/02* (2013.01); *B32B 2307/42* (2013.01); *B32B 2309/10* (2013.01); *B32B 2457/20* (2013.01); *G02F 1/1303* (2013.01); *G02F 2202/28* (2013.01); *Y10T 156/1064* (2015.01); *Y10T 156/1082* (2015.01)

(56) References Cited

FOREIGN PATENT DOCUMENTS

| | | |
|---|---|---|
| JP | 2008-168542 A | 7/2008 |
| JP | 2011-227336 A | 11/2011 |
| JP | 2013-008006 A | 1/2013 |
| KR | 10-0537295 B1 | 12/2005 |
| KR | 10-0538648 B1 | 12/2005 |
| KR | 10-1221720 B1 | 1/2013 |
| KR | 10-2015-0104473 A | 9/2015 |
| KR | 10-1571862 B1 | 11/2015 |
| TW | 201422415 A | 6/2014 |

[Figure 1]
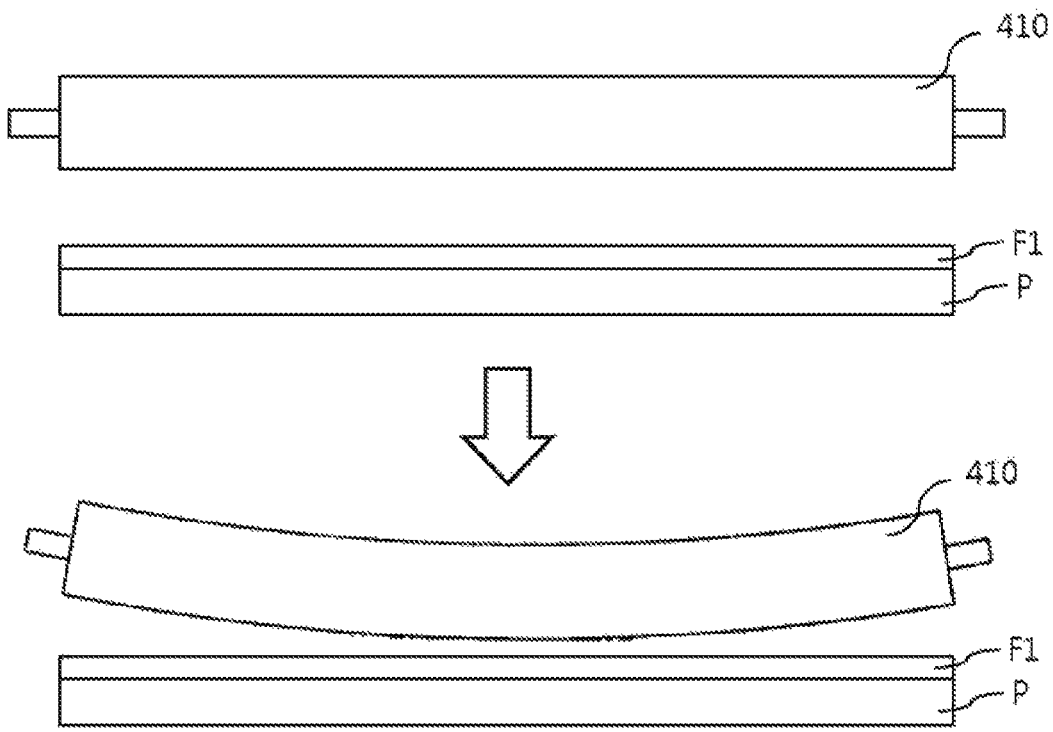

[Figure 2]
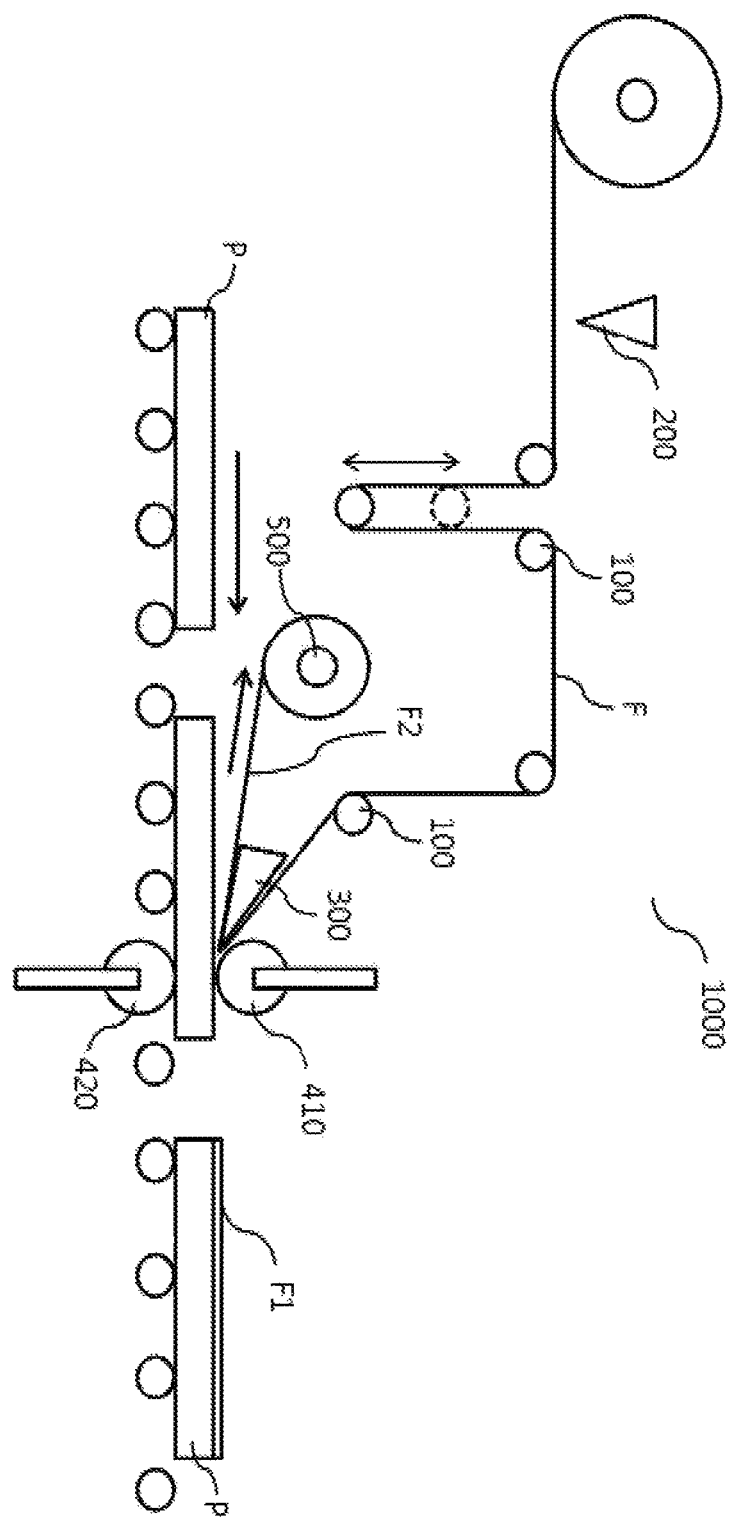

[Figure 3]
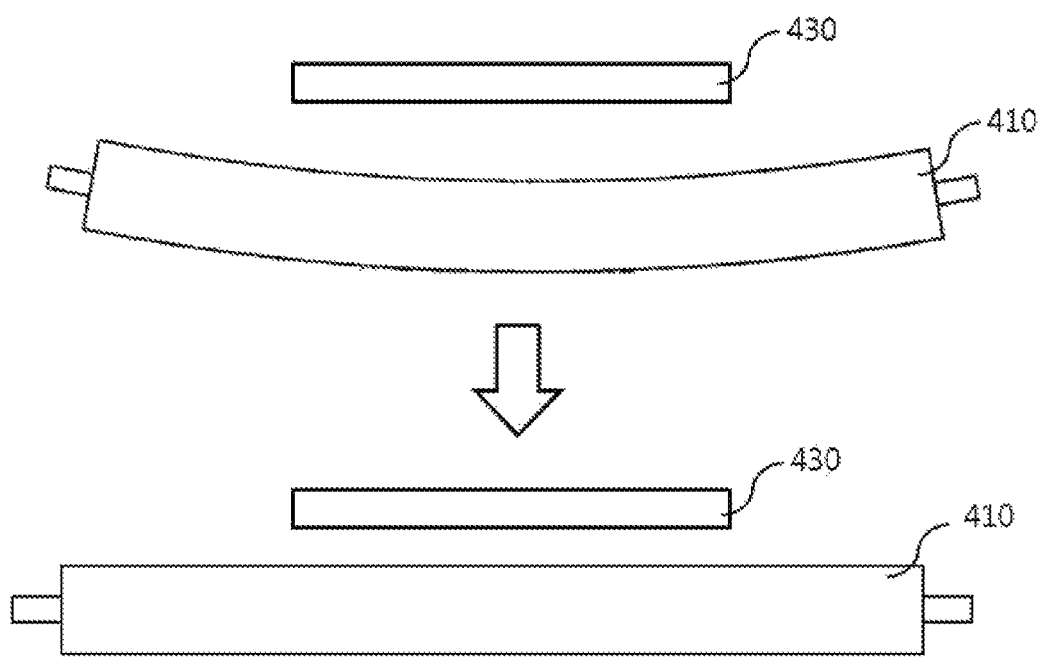

[Figure 4]
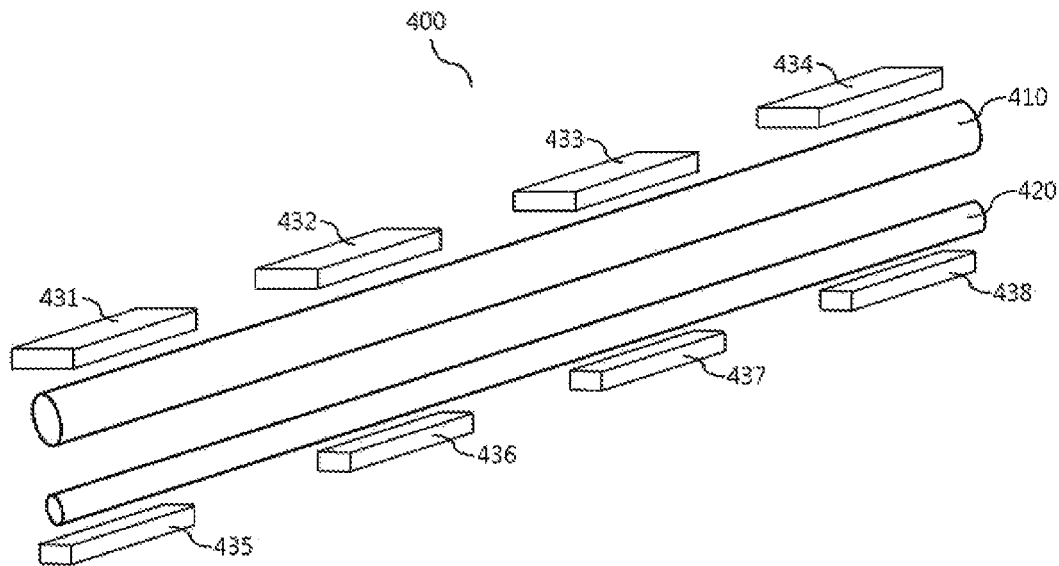
[Figure 5]
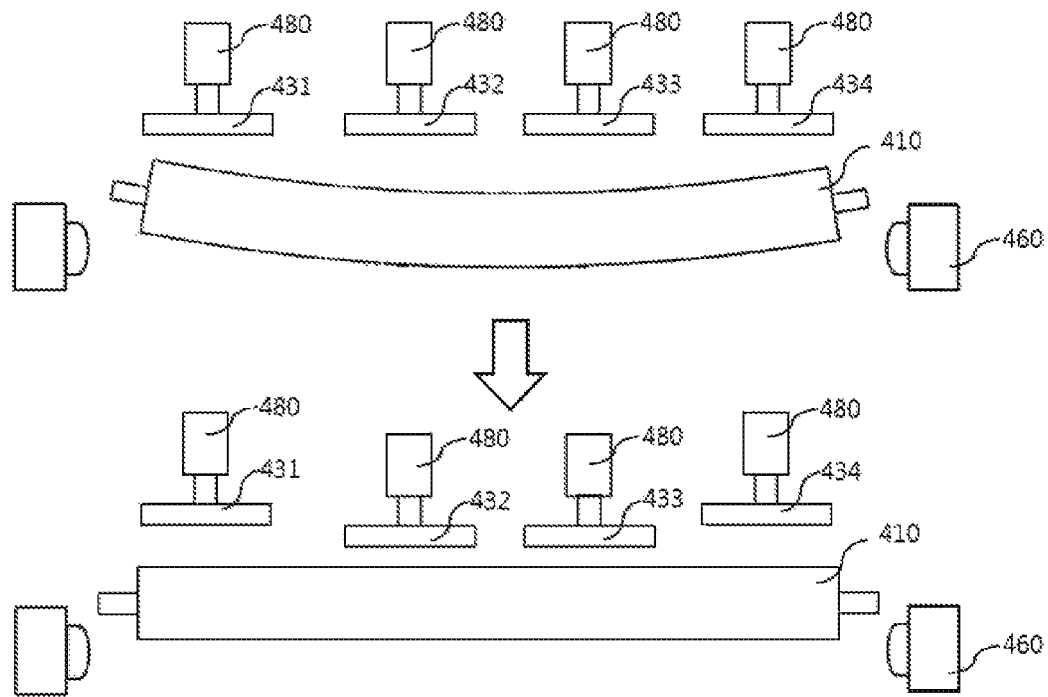

[Figure 6a]
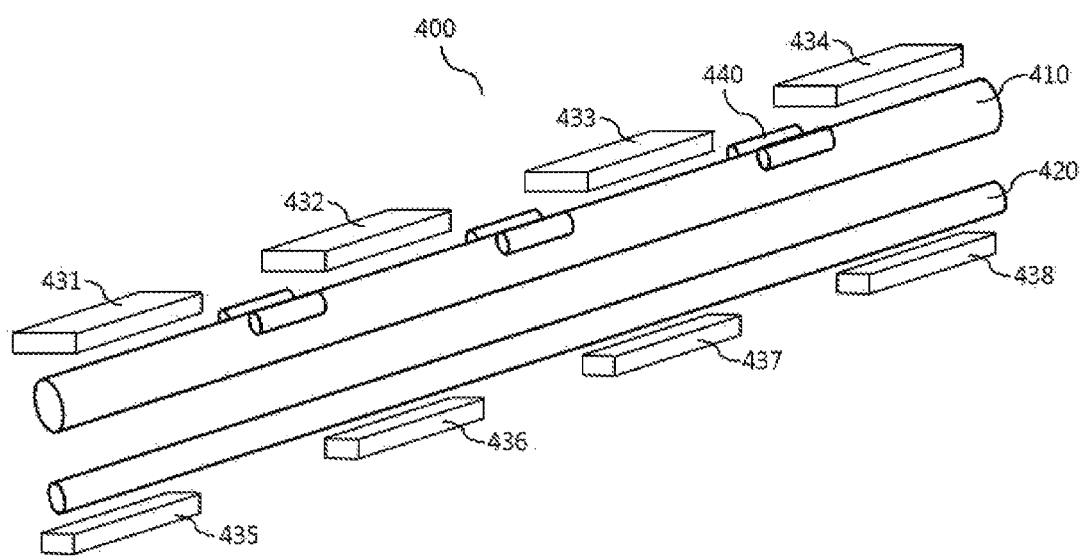
[Figure 6b]
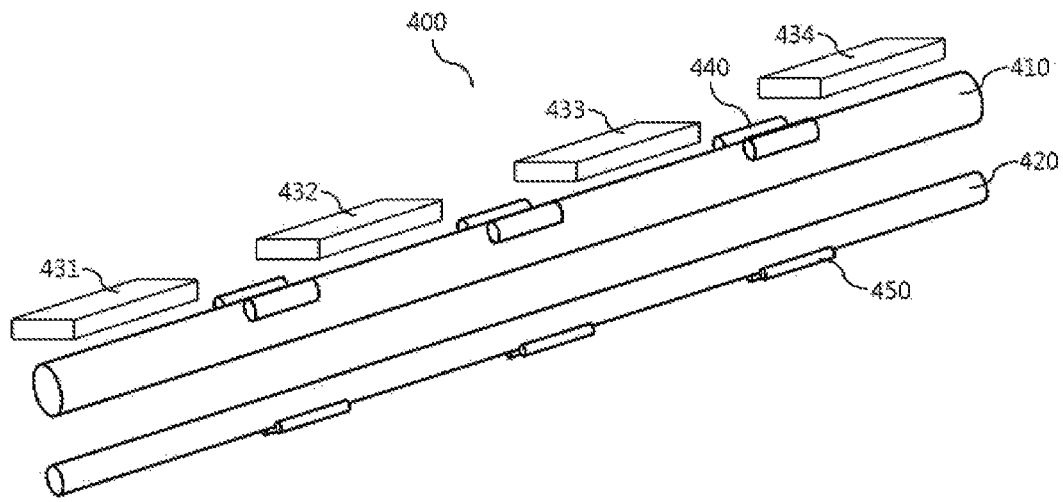

[Figure 6c]
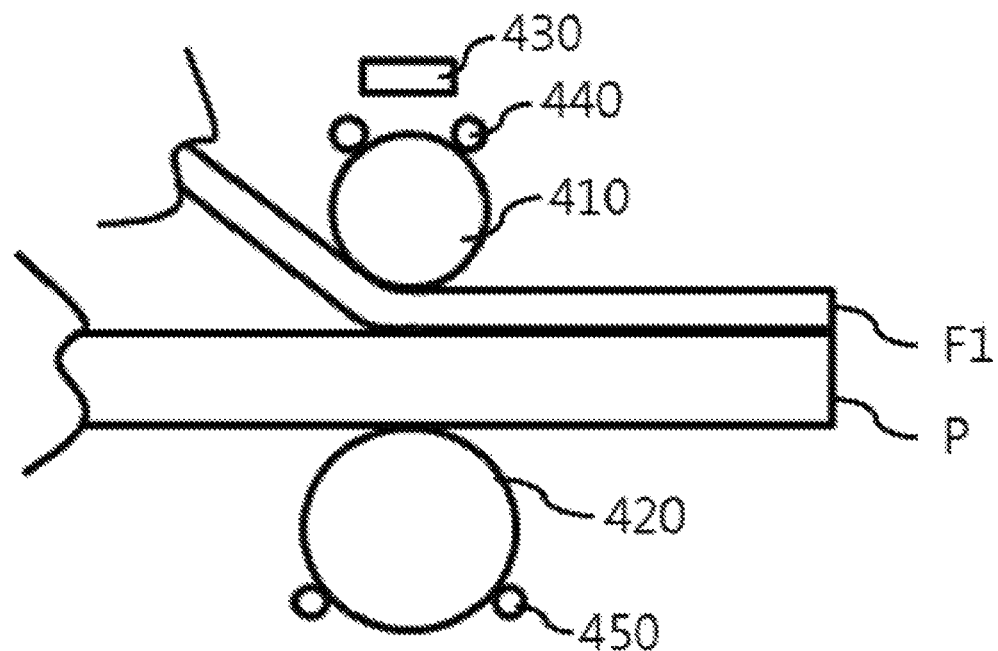
[Figure 6d]
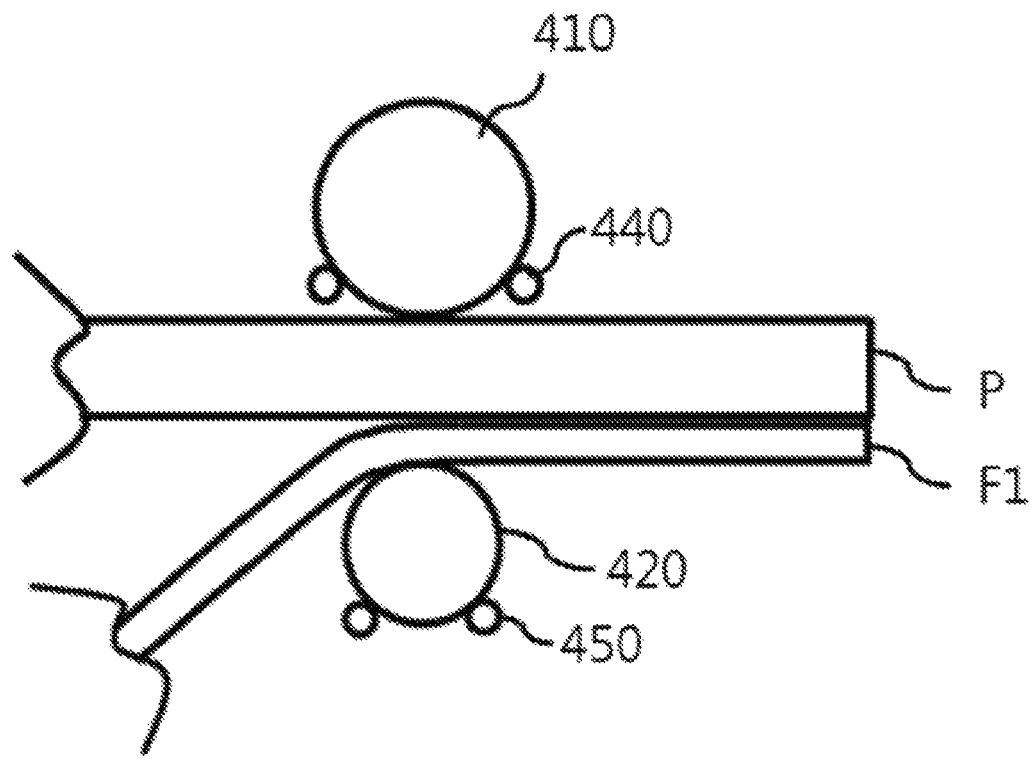

[Figure 7]
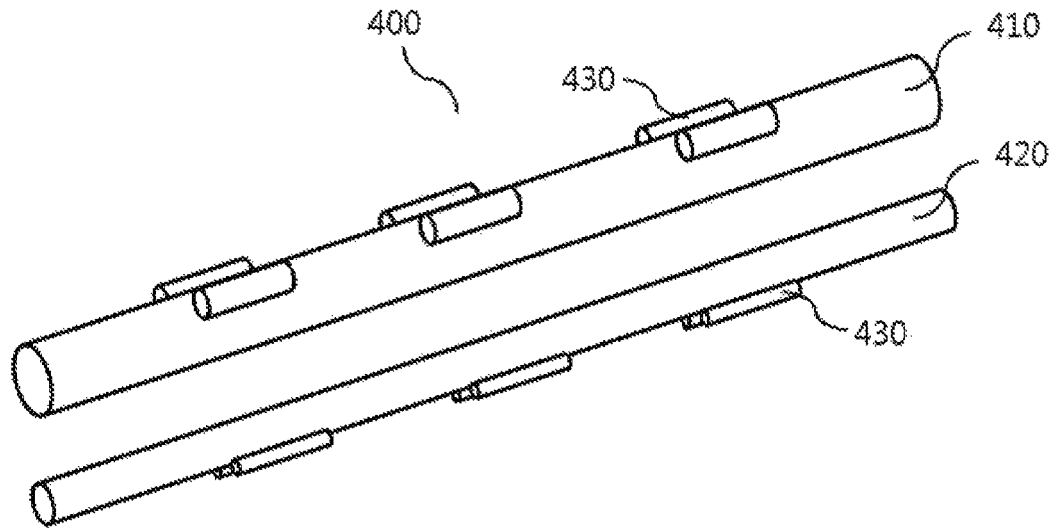
[Figure 8]
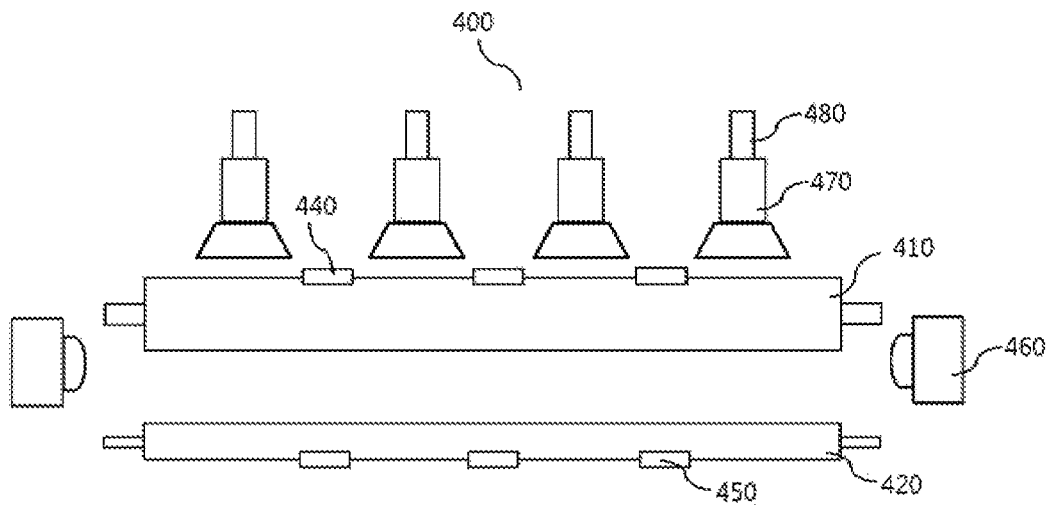

SYSTEM FOR MANUFACTURING DISPLAY UNIT

The present application is a National Phase entry pursuant to 35 U.S.C. § 371 of International Application No. PCT/KR2017/007630 filed on Jul. 17, 2017, and claims the benefit of Korean Patent Application No. 10-2016-0108476, filed on Aug. 25, 2017, in the Korean Intellectual Property Office, the disclosures of which are incorporated herein in their entirety by reference.

TECHNICAL FIELD

The present invention relates to a system for manufacturing a display unit, and more particularly, to a system for manufacturing a display unit, which improves the precision of attachment of an optical film to a panel in order to effectively suppress a defect of a manufactured display unit.

BACKGROUND

Display units such as a liquid crystal display (LCD), an organic light emitting diode (OLED), a plasma display panel (PDP), and an electrophoretic display (EPD), are manufactured through several processes. Particularly, the manufacturing process includes a process of attaching an optical film to a panel. The optical film is attached to one surface and to another surface of the panel, and when an absorption axis of a polarizing film included in the optical film attached to one surface of the panel is vertical to an absorption axis of a polarizing film included in the optical film attached to the other surface of the panel, the panel is normally operated. Accordingly, there is a need for a system for manufacturing a display unit, which attaches the optical film to both surfaces of the panel in one process so that the absorption axes are vertical to each other.

The system for manufacturing a display unit, which attaches an optical film to both surfaces of a panel in one process, may be operated as described below.

An optical film including a polarizing film is supplied to the system for manufacturing the display unit. When the optical film having a width corresponding to a short side of the panel is supplied by a supply roll, the supplied optical film is carried to an attachment position, at which the optical film is attached to one surface of the panel by a carrying unit. The optical film may be cut to have a size corresponding to a size of the panel before being carried to the attachment position. The cut optical film is attached onto one surface of the panel by an attachment unit including an attachment roll. Then, the optical film having a width corresponding to a long side of the panel is supplied by a supply roll, and the optical film is attached to the other surface of the panel by the same method as that described above.

However, conventional systems for manufacturing the display unit, which attaches the optical film onto both surfaces of the panel, may show the following problems.

FIG. 1 is a diagram illustrating a situation in which an attachment roll having a predetermined length or more sags in a down direction after a predetermined time.

When a size of a panel used for manufacturing a super-sized display unit is increased (for example, when a size of a screen is 98 inches, hereinafter, referred to as a large-area panel), a length of an attachment roll for attaching an optical film having a width corresponding to a long side of the large-area panel onto one surface of the large-area panel is increased. As illustrated in FIG. 1, according to the increase in the length of the attachment roll, the attachment roll sags in a downward direction. Accordingly, when the optical film is attached to the large-area panel, a defect factor is generated between attachment surfaces of the optical film and the large-area panel, thereby degrading a quality of the display unit.

In order to solve this problem, there is suggested a process of cutting the optical film having the width corresponding to the long side of the large-area panel into a piece of paper having a sheet form in accordance with a size of the large-area panel, connecting short sides of the plurality of cut optical films, winding the optical films in a roll type, and supplying the optical films to the system for manufacturing the display unit. However, there is still a need for separate equipment for performing a process of re-connecting and winding the optical films, and productivity is reduced in manufacturing the display unit.

SUMMARY

Accordingly, there is a demand for a technology for suppressing a phenomenon, in which the attachment roll sags due to weight, to improve precision of the attachment of the optical film to the panel.

DETAILED DESCRIPTION

Technical Problem

The present invention has been made in an effort to provide a system for manufacturing a display unit, which suppresses an attachment roll from sagging due to weight, thereby improving a quality of an attachment of an optical film to a panel and productivity of a display unit.

Technical Solution

An exemplary embodiment of the present invention provides a system for manufacturing a display unit, which attaches an optical film to a panel, the system including: a carrying unit which carries the optical film including a polarizing film; a cutting unit which cuts the optical film so as to have a size corresponding to a size of the panel; and an attachment unit which attaches the optical film to the panel, in which the attachment unit includes: an attachment roll which presses and attaches the optical film onto one surface of the panel; and a sagging suppressing unit which suppresses the attachment roll from sagging.

The sagging suppressing unit may include a magnetic force generating unit which suppresses the attachment roll from sagging by using magnetic force.

The magnetic force generating unit may include a permanent magnet having an intensity of 20 to 50 MGOe.

The magnetic force generating unit may include an electromagnet, of which magnetic force is adjusted by the amount of an applied current.

The magnetic force generating unit may include a plurality of unit magnetic force generating units which is disposed while being spaced apart from one another in a longitudinal direction of the attachment roll.

The sagging suppressing unit may include a support part which is in contact with a part of an outer peripheral surface of the attachment roll and supports the attachment roll.

The sagging suppressing unit may include a distance adjusting unit which adjusts a distance between the magnetic force generating unit and the attachment roll.

A diameter of the attachment roll may be 20 to 80 mm.

A length of the attachment roll may be 1,800 to 3,700 mm.

The magnetic force generating unit may be in contact with a part of an outer peripheral surface of the attachment roll and may be formed in a form of a roll which is capable of supporting the attachment roll.

The attachment roll may include a ferromagnetic substance at a position facing the magnetic force generating unit.

According to the exemplary embodiment of the present invention, the sagging suppressing unit suppresses the attachment roll from sagging due to weight, thereby improving precision and a quality of an attachment of the optical film F to the panel P and effectively suppressing a defect of a manufactured display unit.

According to another exemplary embodiment of the present invention, the attachment roll is suppressed from sagging due to weight by sucking the attachment roll, thereby improving precision and a quality of an attachment of an optical film to a panel. Further, foreign substances, dust, and the like around the attachment roll are sucked and removed during a process of sucking the attachment roll and suppressing the attachment roll from sagging, thereby improving a quality of a manufactured display unit.

BRIEF DESCRIPTION OF THE DRAWINGS

FIG. 1 is a diagram illustrating a situation in which an attachment roll having a predetermined length or more sags in a down direction after a predetermined time.

FIG. 2 is a diagram schematically illustrating an example of a system for manufacturing a display unit, which attaches an optical film onto one surface of a panel according to an exemplary embodiment of the present invention.

FIG. 3 is a diagram schematically illustrating an attachment unit including a magnetic force generating unit according to the exemplary embodiment of the present invention.

FIG. 4 is a diagram schematically illustrating an attachment unit including the plurality of unit magnetic force generating units according to the exemplary embodiment of the present invention.

FIG. 5 is a diagram illustrating an adjustment of a distance between the magnetic force generating unit and the attachment roll by a distance adjusting unit according to the exemplary embodiment of the present invention.

FIGS. 6A to 6D are diagrams schematically illustrating the attachment unit including the magnetic force generating unit and a support part according to the exemplary embodiment of the present invention.

FIG. 7 is a diagram illustrating the magnetic force generating unit formed in a form of a roll according to the exemplary embodiment of the present invention.

FIG. 8 is a diagram schematically illustrating an attachment unit including a suction part according to another exemplary embodiment of the present invention.

MODES FOR INVENTION

Hereinafter, an exemplary embodiment of the present invention will be described in detail with reference to the accompanying drawings so that those skilled in the art can easily carry out the present invention. However, the present invention may be implemented in various different forms, and is not limited to the exemplary embodiments described herein. A part irrelevant to the description will be omitted in the drawings to clearly describe the present invention, and the similar elements will be designated by the similar reference numerals throughout the specification.

Terms used in the present specification will be briefly described, and the present invention will be described in detail.

As terms used in the present invention, general terms currently and widely used are selected while considering the functions in the present invention, but the terms may be changed according to an intention of those skilled in the art or precedent, appearance of new technology, and the like. Further, in a specific case, there is a term randomly selected by an applicant, and in this case, a meaning of the term will be described in detail in the corresponding description of the invention. Accordingly, the terms used in the present invention shall be defined based on the meaning of the term and the contents throughout the present invention, not the simple name of the term.

Throughout the specification, unless explicitly described to the contrary, the word "comprise" and variations such as "comprises" or "comprising" will be understood to imply the inclusion of stated elements but not the exclusion of any other elements.

Hereinafter, the present invention will be described in detail with reference to the accompanying drawing.

According to an exemplary embodiment of the present invention, as illustrated, for example, in FIG. 2, there is provided a system 1000 for manufacturing a display unit, which attaches an optical film F to a panel P, the system 1000 including: a carrying unit 100 which carries the optical film F including a polarizing film; a cutting unit 200 which cuts the optical film F so as to have a size corresponding to a size of the panel P; and an attachment unit 400 (e.g., FIGS. 4, 6a, 6b, 7 and 8) which attaches the optical film F to the panel P, and the attachment unit 400 includes an attachment roll which presses and attaches the optical film F onto one surface of the panel P; and a sagging suppressing unit which suppresses the attachment roll from sagging.

According to the exemplary embodiment of the present invention, the sagging suppressing unit suppresses the attachment roll from sagging due to weight, thereby improving precision and quality of an attachment of the optical film F to the panel P and effectively suppresses a defect of a manufactured display unit.

When the display unit is manufactured, the optical film may be attached onto the panel by various methods.

The display unit may be manufactured by using the optical film including a polarizing film including an adhesive layer, and a release film to which the polarizing film is bonded so as to be peeled off through the adhesive layer. A process of attaching the optical film to the panel may be performed as described below. For example, the display unit may be manufactured by forming an optical film sheet piece on the optical film by cutting (so called, half-cutting) the optical film including the polarizing film formed with the adhesive layer by a predetermined depth by which the release film is not cut, peeling the optical film sheet piece from the release film, and attaching the optical film sheet piece to the panel through the adhesive layer of the peeled optical film sheet piece. Further, the display unit may be manufactured by forming the optical film sheet piece in a form of a sheet by cutting (so called, full-cutting) the entire optical film to have a size corresponding to a size of the panel, peeling the release film from the optical film sheet piece, and attaching the peeled optical film sheet piece to the panel. Further, the display unit may be manufactured by peeling the release film from the optical film, attaching the optical film onto the panel through the adhesive layer, and then cutting the optical film attached onto the panel so as to have the size corresponding to the size of the panel.

The display unit may be manufactured by using the optical film including the adhesive layer and the polarizing film without the release film. For example, the display unit may be manufactured by applying an adhesive or an ultraviolet curable adhesive onto one surface of the optical film, attaching the optical film onto the panel through the adhesive, and cutting the optical film attached onto the panel so as to have the size corresponding to the size of the panel. Further, the display unit may be manufactured by forming a piece of sheet by cutting the optical film so as to have the size corresponding to the size of the panel, applying the adhesive onto one surface of the sheet piece, and attaching the optical film onto the panel through the adhesive.

According to the exemplary embodiment of the present invention, the display unit may be manufactured by various methods as described above, and when the display unit is manufactured by the foregoing methods and the like, the attachment roll which attaches the optical film onto the panel may be effectively suppressed from sagging due to weight.

Further, hereinafter, for convenience of the description, the system for manufacturing the display unit by attaching an optical film sheet piece which is formed by half-cutting the optical film including the polarizing film formed with the adhesive layer onto the panel will be mainly described in detail.

FIG. 2 is a diagram schematically illustrating an example of the system for manufacturing the display unit, which attaches the optical film onto one surface of the panel according to the exemplary embodiment of the present invention.

The system 1000 for manufacturing the display unit according to the exemplary embodiment of the present invention may use the optical film F including the adhesive layer, the polarizing film, and a release film F2. The optical film F may include the polarizing film, and may further include a film, such as a phase difference film, a viewing angle compensation film, and a brightness improving film, having an optical characteristic, in addition to the polarizing film. That is, the optical film F, in which a film having an optical characteristic is attached onto one surface or both surfaces of the polarizing film, may be used.

The polarizing film may include a polarizer having a thickness of for example, 5 to 80 μm, and a polarizer protecting film which is attached onto one surface or both surfaces of the polarizer and has a thickness of about 1 to 500 μm. An appropriate transparent film may be used as the polarizer protecting film which may be attached onto one surface or both surfaces of the polarizer. As the polarizer protecting film, a thermoplastic resin having excellent transparency, mechanical strength, thermal stability, a moisture barrier property, and isotropy may be used. As the thermoplastic resin, for example, a cellulose resin, such as triacetyl cellulose, a polyester resin, a polyether sulfone resin, a polysulfone resin, a polycarbonate resin, a polyamide resin, a polyimide resin, a polyolefin resin, a methacrylate resin, a cyclic polyolefin resin (norbornene-based resin), a polyarylate resin, a polystyrene resin, a polyvinyl alcohol resin, and a mixture thereof may be used. Further, one or more kinds of adhesives may be included in the polarizer protecting film. As the adhesive, for example, an ultraviolet ray absorber, an oxidation inhibitor, a plasticizer, a releasing agent, a coloring inhibitor, a flame retardant, an electrification suppressant, a pigment, and a coloring agent may be used.

The optical film F may include a surface protecting film, and the surface protecting film may be used for the purpose of suppressing a surface of the optical film from being contaminated or damaged in a distribution process of the optical film, the process of the attachment of the optical film to the panel, and the like. The surface protecting film may be bonded to the optical film through the adhesive, and may be bonded to the optical film so that the surface protecting film is easily peeled from the optical film. Further, as the surface protecting film, for example, a polyethylene film, a polypropylene film, and a polyethylene terephthalate film may be used, but a material of the surface protecting film is not limited to the foregoing example.

The adhesive layer is formed on one surface of the optical film so as to attach the optical film F to one surface of the panel P. The adhesive layer may be formed of, for example, an acryl-based adhesive, a silicon-based adhesive, or a urethane-based adhesive, and may have a thickness of 10 to 50 μm. Further, the release film F2 which suppresses the adhesive layer from being contaminated by foreign substances in a process of transferring the optical film F before the optical film F is attached onto the panel, and protects the adhesive layer is attached to the adhesive layer. As the release film F2, for example, a polyolefin-based film, such as polyethylene, polypropylene, poly-1-butene, poly-4-methyl-1-pentene, ethylene-propylene copolymer, ethylene-1-butene copolymer, ethylene-vinyl acetate copolymer, ethylene-ethyl acrylate copolymer, and ethylene-vinyl alcohol copolymer, a polyester-based film, such as polyethylene terephthalate, polyethylene naphthalate, and polybutylene terephthalate, or a polyamide-based film, such as polyacrylate, polystyrene, nylon 6, partial aromatic polyamide, may be used.

The optical film F used in the system 1000 for manufacturing the display unit according to the exemplary embodiment of the present invention may have a width corresponding to a long side or a short side of the panel P. For example, the display unit may be manufactured by bonding an optical film sheet piece F1, which is formed by cutting the roll-type optical film F having a width corresponding to a long side of the panel P into a sheet piece having a predetermined length, to one surface of the panel P, and bonding the optical film sheet piece F1, which is formed by cutting the roll-type optical film F having a width corresponding to a short side of the panel P into a sheet piece having a predetermined length, to the other surface of the panel P.

Particularly, the optical film sheet piece F1 having the width corresponding to the long side of the panel P may be attached onto one surface of the panel P at a lower side of the panel P, the panel P may be reversed, and then the optical film sheet piece F1 having the width corresponding to the short side of the panel P may be attached onto the other surface of the panel P at the lower side of the panel P. Further, the optical film sheet piece F1 having the width corresponding to the long side of the panel P may be attached onto one surface of the panel P at an upper side of the panel P, and the optical film sheet piece F1 having the width corresponding to the short side of the panel P may be attached onto the other surface of the panel P at the lower side of the panel P without reversing the panel P. Further, the optical film sheet piece F1 having the width corresponding to the long side of the panel P may be attached onto one surface of the panel P at the lower side of the panel P, and the optical film sheet piece F1 having the width corresponding to the short side of the panel P may be attached onto the other surface of the panel P at the upper side of the panel P without reversing the panel P.

The carrying unit 100 according to the exemplary embodiment of the present invention carries the optical film F including the polarizing film including the adhesive layer and the release film F2 bonded to the adhesive layer so as to be peeled off to a downstream side of the system for manufacturing the display unit of the present invention. For example, the carrying unit 100 may carry the optical film F, which is attached onto one surface of the panel P and has the width corresponding to a length of the long side of the panel P, or the optical film F, which is attached onto the other surface of the panel P and has the width corresponding to a length of the short side of the panel P.

The carrying unit 100 may include various transferring means which are capable of carrying the optical film F. For example, the carrying unit 100 may carry the optical film F by using a conveyor belt or a roller.

The system 1000 for manufacturing the display unit according to the exemplary embodiment of the present invention may include the cutting unit 200 which cuts (so called, half-cuts) the polarizing film and the adhesive layer with a predetermined interval without cutting the release film F2 on the optical film F and forms the optical film sheet piece F1. The cutting unit 200 may half-cut the optical film F to have a size corresponding to the size of the panel P and sequentially form the optical film sheet piece F1 on the optical film F. For example, the cutting unit 200 may sequentially form the optical film sheet piece F1 on the optical film F, which is attached onto one surface of the panel P and has the width corresponding to the length of the long side of the panel P, by cutting the optical film F by an interval corresponding to the length of the short side of the panel P, and may sequentially form the optical film sheet piece F1 on the optical film F, which is attached onto the other surface of the panel P and has the width corresponding to the length of the short side of the panel P, by cutting the optical film F by an interval corresponding to the length of the long side of the panel P.

The cutting unit 200 may include various cutting means which are capable of cutting the optical film F. For example, a laser device and a cutter may be used as the cutting unit 200.

The carried optical film F may go through an examination process before being cut by the cutting unit 200. In the examination process, light may be emitted to the optical film F by using a light source, an image of transmissive light or reflective light emitted from the optical film F in the emitted light may be photographed, and the image may be processed to examine a flaw on the optical film F. For example, a method of detecting a flaw through a light and shade determination by binarization processing may be used as the image processing method. A cutting position of the optical film F may be determined by using location information of the flaw calculated by the examination process.

By using the location information of the flaw of the optical film F calculated in the examination process, the cutting unit 200 may half-cut the optical film F so that the flaw is not included in the optical film sheet piece F1 attached to the panel P. The optical film including the flaw is not attached to the panel P and is excluded, so that it is possible to improve yield of the display unit.

The peeling unit 300 folds back the release film F2 in the optical film F carried by the carrying unit 100 toward the inner side and peels the optical film sheet piece F1 and the adhesive layer from the release film F2. For example, a knife edge portion may be formed at a leading end of the peeling unit 300, and a curvature radius of the knife edge portion may be 0.3 to 5.0 mm. A carrying direction of the release film F2 in the carried optical film F is changed at the leading end of the peeling unit 300, so that the release film F2 may be peeled from the optical film sheet piece F1. The peeled release film F2 is wound by a winding unit 500.

According to the exemplary embodiment of the present invention, the attachment unit 400 includes an attachment roll which presses and attaches the optical film F onto one surface of the panel P, and the attachment roll may be formed of an upper attachment roll 410 and a lower attachment roll 420. The optical film F is pressed to one surface of the panel P during a process, in which the panel P and the optical film F pass between the pair of attachment rolls 410 and 420, so that the optical film F may be attached onto one surface of the panel P.

The system 1000 for manufacturing the display unit may include a first attachment unit which attaches the optical film F having the width corresponding to the long side of the panel P onto one surface of the panel P, and a second attachment unit which attaches the optical film F having the width corresponding to the short side of the panel P onto the other surface of the panel P. The pair of attachment rolls of the first attachment unit may have a length corresponding to that of the long side of the panel P, and the pair of attachment rolls of the second attachment unit may have a length corresponding to that of the short side of the panel P. For example, in order to manufacture the supersized display unit having a length of the long side of 1,800 mm or more, a panel (hereinafter, a large-area panel) having a size corresponding to the size of the display unit is used. In order to attach the optical film F onto one surface of the large-area panel P having the long side having a length of 1,800 mm or more, the pair of attachment rolls of the first attachment unit has a length of 1,800 mm or more so as to correspond to the long side of the large-area panel P. However, referring to FIG. 1, the attachment roll having a predetermined length or more may sag in a down direction due to weight. As illustrated in FIG. 1, when the optical film F is attached onto one surface of the panel P in a state where the attachment roll sags in the down direction and is bent, the attachment roll cannot evenly press the optical film F and vibrations are generated during a rotation of the attachment roll, so that precision of the attachment of the optical film F is considerably decreased and thus an attachment defect is generated.

In order to solve the problem, strength of the attachment roll is enhanced by increasing a diameter of the attachment roll or inserting a filling material into an inner side of the attachment roll to suppress the attachment roll from sagging due to weight. However, the method of increasing the diameter of the attachment roll or inserting the filling material into the inner side of the attachment roll described above increases manufacturing cost of the attachment roll, so that the method is not efficient. Further, when the diameter of the attachment roll is increased, precision of the attachment of the optical film F is degraded, and a wrinkle is generated in the optical film F attached onto the panel P or bubbles are generated between the panel P and the optical film F, so that a defect is generated in the manufactured display unit.

FIG. 3 is a diagram schematically illustrating the attachment unit including a magnetic force generating unit according to the exemplary embodiment of the present invention.

According to the exemplary embodiment of the present invention, the attachment unit 400 may include a sagging suppressing part, thereby suppressing the attachment roll from sagging due to weight. The sagging suppressing part may include a magnetic force generating unit 430, and the magnetic force generating unit 430 may suppress the attachment roll from sagging due to weight by applying attractive force or repulsive force by magnetic force to the attachment roll.

For example, the magnetic force generating unit 430 may be provided at an upper side of the upper attachment roll 410 which is positioned at an upper side between the pair of attachment rolls, so that the magnetic force generating unit 430 attracts the upper attachment roll 410 by applying attractive force to the upper attachment roll 410 to suppress the attachment roll from sagging. The magnetic force generating unit 430 may be provided at a lower side of the lower attachment roll 420 which is positioned at a lower side between the pair of attachment rolls, so that the magnetic force generating unit 430 pushes up the lower attachment roll 420 by applying repulsive force to the lower attachment roll 420 to suppress the attachment roll from sagging. Further, the magnetic force generating unit 430 may be provided at both sides of a lower portion of the upper attachment roll 410 to push up the upper attachment roll 410 by applying repulsive force to the upper attachment roll 410. The magnetic force generating unit 430 may be provided at both sides of an upper portion of the lower attachment roll 430 to attract the lower attachment roll 430 by applying attractive force to the lower attachment roll 430.

The upper attachment roll 410 or the lower attachment roll 420 may include a magnet so that repulsive force is generated between the upper attachment roll 410 or the lower attachment roll 420 and the magnetic force generating unit 430. For example, a magnet may be formed in the attachment roll so that the same pole as that of a pole (an N-pole or an S-pole) of the magnetic force generating unit 430 formed in a direction of the attachment roll is formed in a direction of the magnetic force generating unit 430.

However, the magnetic force generating unit 430 may be provided at the upper side of the upper attachment roll 410 or the lower side of the lower attachment roll 420 so as to allow the optical film F and the panel P to pass between the upper attachment roll 410 and the lower attachment roll 420 and prevent the process of attaching the optical film F onto one surface of the panel P from being disrupted.

That is, according to the exemplary embodiment of the present invention, the magnetic force generating unit 430 provided at the upper side of the upper attachment roll 410 may suppress the upper attachment roll 410 from sagging by applying attractive force to the upper attachment roll 410, and the magnetic force generating unit 430 provided at the lower side of the lower attachment roll 420 may effectively suppress the lower attachment roll 420 from sagging by applying repulsive force to the lower attachment roll 420. The attachment roll is suppressed from sagging, thereby improving precision and a quality of the attachment of the optical film F to the panel P.

Further, the amount of attractive force applied by the magnetic force generating unit 430 provided at the upper side of the upper attachment roll 410 to the upper attachment roll 410 may be larger than or equal to of the amount of gravity applied to the upper attachment roll 410, but the amount of the attractive force and a amount of gravity may be the same as each other. Similarly, an amount of repulse force applied by the magnetic force generating unit 430 provided at the lower side of the lower attachment roll 420 to the lower attachment roll 420 may be the same as the amount of gravity applied to the lower attachment roll 420.

The magnetic force generating unit 430 may include a permanent magnet having an intensity of 20 to 50 MGOe. For example, a neodymium magnet, a ferrite magnet, an alnico magnet, and a samarium cobalt (SmCo) magnet may be used as the permanent magnet, but the kind of permanent magnet is not limited to the foregoing example.

Further, an intensity of the permanent magnet included in the magnetic force generating unit 430 may be varied according to a distance between the magnetic force generating unit 430 and the attachment roll and weight or a material of the attachment roll. However, in order to effectively suppress the attachment roll from sagging and make the attachment roll precisely horizontal in a longitudinal direction of the attachment roll, the permanent magnet having an intensity of 20 to 50 MGOe may be used.

FIG. 4 is a diagram schematically illustrating the attachment unit including the plurality of unit magnetic force generating units according to the exemplary embodiment of the present invention.

The magnetic force generating unit 430 may include the plurality of unit magnetic force generating units disposed while being spaced apart from one another in the longitudinal direction of the attachment roll. Referring to FIG. 4, the plurality of magnetic force generating units 430 may be provided at the upper side of the upper attachment roll 410 in the longitudinal direction of the upper attachment roll 410 (431-434). Further, the plurality of magnetic force generating units 430 may be provided at the lower side of the lower attachment roll 420 in the longitudinal direction of the lower attachment roll 420 (435-438).

As illustrated in FIG. 4, the magnetic force generating unit includes the plurality of unit magnetic force generating units, so that equipment cost may be decreased, and availability of a space around the attachment roll may be increased, so that a subsidiary unit, such as a suction part, which is capable of sucking and removing foreign substances and the like, may be installed around the attachment roll.

An intensity of the permanent magnet included in the magnetic force generating unit 430 may be varied according to a position at which the magnetic force generating unit 430 is provided. For example, intensities of the permanent magnets of the unit magnetic force generating units 432 and 433 provided at an upper side of a center portion of the upper attachment roll 410 may be larger than intensities of the permanent magnets of the unit magnetic force generating units 431 and 434 provided at upper sides of both side portions of the upper attachment roll 410. The center portion of the upper attachment roll 410 sags more than both side portions of the upper attachment roll 410 due to weight. Accordingly, the unit magnetic force generating units 432 and 433 provided at the uppers side of the center portion of the upper attachment roll 410 include the permanent magnets having larger magnetic force than that of the permanent magnets of the unit magnetic force generating units 431 and 434 provided at the upper sides of the both side portions, so that it is preferable to apply larger attractive force to the center portion of the upper attachment roll 410. Further, the unit magnetic force generating units 436 and 437 provided at the lower side of the center portion of the lower attachment roll 420 include the permanent magnets having larger magnetic force than that of the permanent magnets of the unit magnetic force generating units 435 and 438 provided at the lower sides of the both side portions, so that it is preferable to apply larger repulsive force to the center portion of the lower attachment roll 420.

Further, the distances, by which the plurality of unit magnetic force generating units is spaced apart from one another, may be different. For example, the distance between the unit magnetic force generating units 432 and 433 provided at the upper side of the center portion of the upper attachment roll 410 may be smaller than the distance between the unit magnetic force generating unit 433 provided at the upper side of the center portion of the upper attachment roll 410 and the unit magnetic force generating unit 434 provided at the upper side of the side portion of the upper attachment roll 410. It is possible to more effectively suppress the sagging phenomenon of the attachment roll by adjusting the distance, by which the plurality of unit magnetic force generating units is spaced apart from one another. However, the plurality of unit magnetic force generating units may maintain a minimum distance, in which the plurality of unit magnetic force generating units does not interfere with one another.

FIG. 5 is a diagram illustrating an adjustment of a distance between the magnetic force generating unit and the attachment roll by a distance adjusting unit according to the exemplary embodiment of the present invention.

The sagging suppressing unit according to the exemplary embodiment of the present invention may include a distance adjusting unit 480 which adjusts a distance between the magnetic force generating unit 430 and the attachment roll. The distance adjusting unit 480 may adjust a distance between the magnetic force generating unit 430 and the attachment roll by moving up and down the magnetic force generating unit 430, thereby suppressing the attachment roll from sagging. For example, when the upper attachment roll 410 sags, the distance adjusting unit 480 shifts the magnetic force generating unit 430 disposed at the upper side of the upper attachment roll 410 and locates the magnetic force generating unit 430 at a point, at which the upper attachment roll 410 is pulled toward the magnetic force generating unit 430 by magnetic force of the magnetic force generating unit 430, so that the sagging of the upper attachment roll 410 disappears, thereby effectively suppressing the upper attachment roll 410 from sagging due to weight. Similarly, when the lower attachment roll 420 sags, the distance adjusting unit 480 shifts the magnetic force generating unit 430 disposed at the lower side of the lower attachment roll 420, thereby effectively suppressing the lower attachment roll 420 from sagging.

The plurality of unit magnetic force generating units which is disposed while being spaced apart from each other in the longitudinal direction of the attachment roll includes the distance adjusting units 480, respectively, so that the plurality of unit magnetic force generating units may be independently shifted in the up and down directions. For example, among the plurality of unit magnetic force generating units including the permanent magnets having the same size of magnetic force, the distance adjusting unit 480 may shift the unit magnetic force generating units 432 and 433 positioned at the upper side of the center portion of the upper attachment roll 410 to be adjacent to the upper attachment roll 410 and may shift the unit magnetic force generating units 431 and 434 positioned at the upper sides of the both side portions of the upper attachment roll 410 to positions spaced apart from the upper attachment roll 410 by a predetermined interval. Since the center portion of the upper attachment roll 410 sags more due to weight than both sides portions of the upper attachment roll 410, the unit magnetic force generating units 432 and 433 positioned at the upper side of the center portion are shifted to be further adjacent to the upper attachment roll 410 than the unit magnetic force generating units 431 and 434 positioned at the upper side of both side portions, thereby effectively suppressing the upper attachment roll 410 from sagging. However, when the intensities of the permanent magnets included in the unit magnetic force generating units are different from one another, the positions of the plurality of unit magnetic force generating units may be adjusted according to the intensities of the permanent magnets included in the unit magnetic force generating units. For example, when the intensities of the permanent magnets included in the unit magnetic force generating units 432 and 433 provided at the upper side of the center portion of the upper attachment roll 410 are larger than the intensities of the permanent magnets included in the unit magnetic force generating units 431 and 434 provided at the upper sides of both side portions of the upper attachment roll 410, the distances between the unit magnetic force generating units 432 and 433 provided at the upper side of the center portion and the upper attachment roll 410 may be adjusted to be similar to the distances between the unit magnetic force generating units 431 and 434 provided at the upper sides of both side portions and the upper attachment roll 410.

The distance adjusting unit 480 according to the exemplary embodiment of the present invention may be connected with a detecting unit 460 to be driven. The sagging of the attachment roll due to weight may be measured by the detecting units 460 provided at both side portions of the attachment roll. The detecting unit 460 may include a plurality of sensors, and a publicly known sensor which is capable of detecting the sagging of the attachment roll may be used as the sensor, but an optical sensor formed of a light emitting unit and a light receiving unit may be used.

Referring to FIG. 5, when the upper attachment roll 410 sags due to weight, light incident from the light emitting unit to the light receiving unit of the detecting unit 460 is blocked by the upper attachment roll 410 which sags due to weight, so that the detecting unit 460 may measure whether the upper attachment roll 410 sags and the degree of sagging of the upper attachment roll 410. Sagging information of the upper attachment roll 410 measured by the detecting unit 460 is transmitted to a control unit (not illustrated). The control unit calculates a point at which the magnetic force generating unit 430 needs to be located based on the sagging information of the upper attachment roll 410 transmitted from the detecting unit 460 and a predetermined intensity of magnetic force of the magnetic force generating unit 430. Information on a shift point of the magnetic force generating unit 430 calculated by the control unit is transmitted to the distance adjusting unit 480. As illustrated in FIG. 5, the distance adjusting unit 480 may shift the magnetic force generating unit 430 to a point, at which the upper attachment roll 410 becomes horizontal in a longitudinal direction by magnetic force of the magnetic force generating unit 430 by using the information transmitted from the control unit.

Accordingly, according to the exemplary embodiment of the present invention, the point, at which the magnetic force generating unit 430 needs to be located, is precisely calculated based on the degree of sagging of the attachment roll, so that it is possible to effectively suppress the sagging of the attachment roll and maintain a horizontal state of the attachment roll in the longitudinal direction.

The magnetic force generating unit 430 according to the exemplary embodiment of the present invention may include an electromagnet of which magnetic force is adjusted by the amount of applied current. The amount of current applied to the electromagnet included in the magnetic force generating unit 430 may be adjusted according to a distance between the magnetic force generating unit 430 and the attachment roll and weight or a material of the attachment roll 410.

The magnetic force generating unit 430 may be provided in the longitudinal direction of the attachment roll, and a size of a current applied to the electromagnet included in the magnetic force generating unit 430 may be different according to a position at which the magnetic force generating unit 430 is provided. For example, sizes of the currents applied to the electromagnets of the unit magnetic force generating units 432 and 433 provided at the upper side of the center portion of the upper attachment roll 410 may be larger than sizes of the currents applied to the electromagnets of the unit magnetic force generating units 431 and 434 provided at upper sides of both side portions of the upper attachment roll 410.

The electromagnet included in the magnetic force generating unit 430 may be connected with the detecting unit 460 to be driven. For example, the detecting unit 460 measures whether the upper attachment roll 410 sags and the degree of sagging of the upper attachment roll 410, and the sagging information of the upper attachment roll 410 measured by the detecting unit 460 is transmitted to the control unit (not illustrated). The control unit calculates an amount of current which needs to be applied to the electromagnet based on the sagging information of the upper attachment roll 410 transmitted from the detecting unit 460. The information calculated by the control unit is transmitted to a control means (not illustrated) which controls the electromagnet of the magnetic force generating unit 430, and the control means may apply the corresponding current, with which the upper attachment roll 410 may become horizontal in the longitudinal direction, to the electromagnet by using the transmitted information.

Accordingly, according to the exemplary embodiment of the present invention, the current is applied to the electromagnet by adjusting the amount of current according to the degree of sagging of the attachment roll due to weight, thereby easily suppressing the attachment roll from sagging.

Further, in order to precisely make the attachment roll be horizontal in the longitudinal direction of the attachment roll, a distance between the magnetic force generating unit 430 and the attachment roll may be adjusted through the distance adjusting unit 480 together with the adjustment of the amount of the current applied to the electromagnet of the magnetic force generating unit 430.

FIGS. 6A to 6D are diagrams schematically illustrating the attachment unit including the magnetic force generating unit and a support part according to an exemplary embodiment of the present invention.

According to the exemplary embodiment of the present invention, the sagging suppressing unit may include a support part which is in contact with a part of an outer peripheral surface of the attachment roll and supports the attachment roll. The support part may be formed in a form of a roll which is capable of supporting the attachment roll, and the plurality of support parts may be provided on the outer peripheral surface of the attachment roll.

Referring to FIG. 6A, attractive force is applied to the upper attachment roll 410 by the magnetic force of the magnetic force generating unit 430 provided at the upper side of the upper attachment roll 410, so that the upper attachment roll 410 may be pulled toward the magnetic force generating unit 430 and be suppressed from sagging due to weight (e.g., 431-434). Further, repulsive force is applied to the lower attachment roll 420 by the magnetic force of the magnetic force generating unit 430 provided at the lower side of the lower attachment roll 420, so that the sagging of the lower attachment roll 420 may be suppressed (e.g., 435-438).

In order to suppress the upper attachment roll 410 from sagging and make the upper attachment roll 410 be horizontal in the longitudinal direction of the upper attachment roll 410, the amount of the attractive force applied to the upper attachment roll 410 by the magnetic force generating unit 430 may be the same as the amount of gravity applied to the upper attachment roll 410. However, the adjustment of the amount of the attractive force applied to the upper attachment roll 410 by the magnetic force generating unit 430 to be exactly the same as the amount of gravity applied to the upper attachment roll 410 may not be easy due to equipment tolerance, manufacturing tolerance, and the like. Accordingly, the amount of the attractive force applied to the upper attachment roll 410 may be adjusted to be slightly larger than the amount of gravity applied to the upper attachment roll 410.

However, when the amount of the attractive force applied to the upper attachment roll 410 is larger than the amount of gravity applied to the upper attachment roll 410, the upper attachment roll 410 may be bent toward the magnetic force generating unit 430 relative to a horizontal line. In this respect, the support part 440 according to the exemplary embodiment of the present invention supports the upper side of the upper attachment roll 410, thereby suppressing the upper attachment roll 410 from being bent toward the magnetic force generating unit 430. As illustrated in FIG. 6A, the plurality of support parts 440 is provided so as to be in contact with the part of the outer peripheral surface of the upper side of the upper attachment roll 410, so that the plurality of support parts 440 may support the upper side of the upper attachment roll 410 so as to prevent the upper attachment roll 410 from being bent toward the magnetic force generating unit 430 by the magnetic force of the magnetic force generating unit 430. Referring to FIG. 6A, in order for the support part to effectively support the attachment roll without being influenced by the magnetic force generating unit, the support part may be provided at the position, at which the unit magnetic force generating units are spaced apart from each other.

Further, the support part 440 is rotatable, so that the support part 440 may support the upper attachment roll 410 without disrupting the upper attachment roll 410 which rotates during the process of attaching the optical film F to the panel P. The support part 440 may be rotated along with the rotation of the upper attachment roll 410, and the support part 440 itself may be individually rotated by providing a separate driving unit.

Referring to FIG. 6B, the upper attachment roll 410 may be suppressed from sagging by the magnetic force generating unit 430 (e.g., 431-434), and the support part 450 formed in the form of the roll may be provided in the lower attachment roll 420, thereby suppressing the lower attachment roll 420 from sagging in the down direction. The plurality of support parts 450 may be provided so as to be in contact with an outer peripheral surface of the lower side of the lower attachment roll 420, and a rotation shaft of the support part 450 is fixed at a predetermined position, thereby supporting the lower attachment roll 420. Further, the support part 450 is rotatable, so that the support part 450 may support the lower attachment roll 420 without disrupting the lower attachment roll 420 which rotates during the process of attaching the optical film sheet piece F1 to the panel P. The support part 450 may be rotated along with the rotation of the lower attachment roll 420, and the support part 450 itself may be individually rotated by providing a separate driving unit.

FIG. 6C is a diagram schematically illustrating the sagging suppressing unit of the attachment unit which attaches the optical film on an upper surface of the panel, and FIG. 6D is a diagram schematically illustrating the sagging suppressing unit of the attachment unit which attaches the optical film on a lower surface of the panel.

As the method of attaching the optical film F onto one surface of the panel P, the optical film F may be attached on the upper surface of the panel P, and the optical film F may be attached on the lower surface of the panel P. Referring to FIG. 6C, when the optical film F is attached on the upper surface of the panel P, it is not easy to provide the support part 440 so as to be in contact with the outer peripheral surface of the lower side of the upper attachment roll 410 for suppressing the upper attachment roll 410 from sagging. As illustrated in FIG. 6C, since the upper attachment roll 410 presses the optical film sheet piece F1 transferred to the upper surface of the panel P toward the upper surface of the panel P and attaches the optical film sheet piece F1 to the panel P, when the support part 440 is provided at the lower side of the upper attachment roll 410, the process of attaching the optical film sheet piece F1 onto one surface of the panel P may be disrupted. Accordingly, when the optical film F is attached on the upper surface of the panel P, the magnetic force generating unit 430 may be provided at the upper side of the upper attachment roll 410 in order to suppress the upper attachment roll 410 from sagging.

Referring to FIG. 6D, when the optical film F is attached on the lower surface of the panel P, the support parts 440 and 450 are provided at the lower side of the upper attachment roll 410 and the lower side of the lower attachment roll 420, thereby suppressing the upper attachment roll 410 and the lower attachment roll 420 from sagging. As illustrated in FIG. 6D, in the case where the optical film sheet piece F1 transferred to the lower surface of the panel P is attached onto the lower surface of the panel P, even though the support parts 440 and 450 are provided at the lower side of the upper attachment roll 410 and the lower side of the lower attachment roll 420, the process of attaching the optical film sheet piece F1 onto one surface of the panel P may not be interfered. However, the support part 440 suppressing the upper attachment roll 410 from sagging may be provided while being in contact with the outer peripheral surface of the lower side of the upper attachment roll 410 at the position, at which the supply of the panel P is not disrupted, during the process of attaching the optical film F onto one surface of the panel P. Further, even when the optical film F is attached on the lower surface of the panel P, the magnetic force generating unit 430 is provided at the upper side of the upper attachment roll 410, as illustrated in FIG. 6C, thereby suppressing the upper attachment roll 410 from sagging.

According to the exemplary embodiment of the present invention, the upper attachment roll 410 and the lower attachment roll 420 having the predetermined lengths or more are suppressed from sagging due to weight, so that it is possible to improve precision of the attachment of the optical film F to the panel P, and it is possible to effectively suppress an attachment defect, such as a generation of wrinkles in the optical film F attached to the panel P or a generation of bubbles between the panel P and the optical film F.

FIG. 7 is a diagram illustrating the magnetic force generating unit formed in a form of a roll according to the exemplary embodiment of the present invention.

The magnetic force generating unit 430 according to the exemplary embodiment of the present invention may be in contact with a part of the outer peripheral surface of the attachment roll and may be formed in a form of a roll which is capable of supporting the attachment roll. Referring to FIG. 7, the magnetic force generating unit 430 in the form of the roll may include a permanent magnet or an electromagnet, so that the magnetic force generating unit 430 may pull the upper attachment roll 410 to the upper side to suppress the upper attachment roll 410 from sagging or push the lower attachment roll 420 in the upper direction to suppress the lower attachment roll 420 from sagging.

The plurality of magnetic force generating units 430 in the form of the roll may be provided while being in contact with the outer peripheral surface of the upper side of the upper attachment roll 410, and the plurality of magnetic force generating units 430 in the form of the roll may be provided while being in contact with the outer peripheral surface of the lower side of the lower attachment roll 420. In the magnetic force generating unit 430 in the form of the roll, for example, a rotation shaft of a roll is fixed at a predetermined position, thereby supporting the attachment roll. Accordingly, it is possible to suppress the attachment roll from sagging by magnetic force of the magnetic force generating unit 430 in the form of the roll, and the magnetic force generating unit 430 in the form of the roll supports the attachment roll, so that the attachment roll may precisely become horizontal in the longitudinal direction of the attachment roll.

A diameter of the attachment roll according to the exemplary embodiment of the present invention may be 20 to 80 mm. In the related art, in order to suppress the attachment roll having a predetermined length or more from sagging due to weight, the attachment roll is manufactured to have a large diameter. However, when a diameter of the attachment roll is increased, weight of the attachment roll is increased according to the increase in the diameter of the attachment roll, so that a sagging phenomenon occurs again, and precision of the attachment of the optical film F to the panel P is degraded, thereby generating an attachment defect.

However, according to the exemplary embodiment of the present invention, the attachment roll may be suppressed from sagging through the magnetic force generating unit 430, so that it is possible to attach the optical film F onto one surface of the panel P by using the attachment roll having a diameter of 20 to 80 mm. Accordingly, it is possible to a remarkable decrease in defects of the manufactured display unit by effectively suppressing the attachment defect, such as a generation of wrinkles in the optical film F attached to the panel P, or a generation of bubbles between the panel P and the optical film. In order to improve precision and quality of the attachment of the optical film F to the panel P, preferably, a diameter of the attachment roll may be 35 to 60 mm, and more preferably, a diameter of the attachment roll may be 20 to 35 mm.

Further, the diameters of the upper attachment roll 410 and the lower attachment roll 420 may be the same as or different from each other. However, in order to improve precision and quality of the attachment of the optical film F to the panel P, a diameter of the attachment roll positioned at the side of one surface of the panel P onto which the optical film F is attached may be smaller than a diameter of the attachment roll positioned at the side of the other surface of the panel P. For example, when the optical film F is attached on the upper surface of the panel P, a diameter of the upper attachment roll 410 positioned at the side of the upper surface of the panel P may be smaller than a diameter of the lower attachment roll 420 positioned at the side of the lower surface of the panel P. Further, when the optical film F is attached on the lower surface of the panel P, a diameter of the lower attachment roll 420 positioned at the side of the lower surface of the panel P may be smaller than a diameter of the upper attachment roll 410 positioned at the side of the upper surface of the panel P. Referring to FIG. 6D, when the optical film F is attached on the lower surface of the panel P, a diameter of the lower attachment roll 420 positioned at the side of the lower surface of the panel P may be 25 to 50 mm, and a diameter of the upper attachment roll 410 positioned at the side of the upper surface of the panel P may be 50 to 80 mm.

A length of the attachment roll may be 1,800 to 3,700 mm. The system 1000 for manufacturing the display unit according to the exemplary embodiment of the present invention includes the first attachment unit which attaches the optical film F having the width corresponding to the long side of the panel P onto one surface of the panel P, and the second attachment unit which attaches the optical film F having the width corresponding to the short side of the panel P onto the other surface of the panel P. For example, in order to manufacture the supersized display unit, of which a length of the long side is 1,800 mm or more, the first attachment unit uses a pair of attachment rolls having a length of 1,800 m to 3,700 mm in order to attach the optical film F having a width corresponding to the long side of the panel P onto one surface of the large-area panel P corresponding to the size of the display unit.

By the magnetic force generating unit 430 and the support rolls 440 and 450 according to the exemplary embodiment of the present invention, it is possible to manufacture the supersized display unit by attaching the optical film F onto one surface of the large-area panel P without the sagging of the pair of attachment rolls having the length of 1,800 to 3,700 mm. However, the length of the pair of attachment rolls may be increased according to the length of the long side of the large-area panel P.

The attachment roll may include a ferromagnetic substance at a position facing the magnetic force generating unit 430. The attachment roll of a metal material may be pulled toward the magnetic force generating unit 430 by magnetic force of the magnetic force generating unit 430, but the attachment roll formed of a nonmagnetic substance has a problem in that the sagging of the attachment roll toward the magnetic force generating unit 430 cannot be suppressed. Accordingly, it is possible to suppress the attachment roll formed of a nonmagnetic substance from sagging by inserting a member formed of a ferromagnetic substance into an inner side of the attachment roll. For example, it is possible to pull or push up the ferromagnetic substance sleeve by magnetic force of the magnetic force generating unit 430 and suppress the attachment roll from sagging by inserting a ferromagnetic substance sleeve formed of iron, cobalt, nickel, or an alloy thereof, into the inner side of the attachment roll formed of carbon, ceramic, and a carbon nanotube.

The ferromagnetic substance member may be formed at an inner side or an external side of the attachment roll at the position facing the magnetic force generating unit 430. As illustrated in FIG. 4, the plurality of unit magnetic force generating units may be disposed in the longitudinal direction of the attachment roll. The plurality of ferromagnetic substance members is formed at the inner side or the external side of the attachment roll at the position facing the plurality of unit magnetic generating unit, thereby effectively suppressing the attachment roll from sagging. The member formed of a paramagnetic substance, such as chrome, platinum, manganese, and aluminum, is formed at the inner side or the external side of the attachment roll, thereby suppressing the attachment roll from sagging.

Further, the attachment roll is manufactured by connecting the unit attachment roll formed of the nonmagnetic substance and the unit ferromagnetic substance formed in a form of a roll, thereby suppressing the attachment roll from sagging. For example, the plurality of unit attachment rolls and the unit ferromagnetic substances are connected and the unit ferromagnetic substance is assembled so as to be disposable at a position facing the unit magnetic force generating unit, thereby effectively suppressing the attachment roll formed of the nonmagnetic substance from sagging.

Accordingly, according to the exemplary embodiment of the present invention, it is possible to suppress the attachment roll from sagging due to weight by manufacturing the attachment roll by using the nonmagnetic material which has hardness and relatively low weight, and it is possible to effectively suppress the attachment roll from sagging by forming the ferromagnetic substance member in the attachment roll formed of the nonmagnetic substance.

FIG. 8 is a diagram schematically illustrating an attachment unit including a suction part according to another exemplary embodiment of the present invention.

According to another exemplary embodiment of the present invention, a sagging suppressing unit may include a suction part 470 which directs suction toward an attachment roll and suppresses the attachment roll from sagging.

According to another exemplary embodiment of the present invention, the attachment roll is suppressed from sagging due to weight by suction directed toward the attachment roll, thereby improving precision and quality of an attachment of an optical film F to a panel P. Further, foreign substances, dust, and the like around the attachment roll are suctioned and removed during a process of suctioning the attachment roll and suppressing the attachment roll from sagging, thereby improving a quality of a manufactured display unit.

The suction part 470 may be provided at an upper side of an upper attachment roll 410 and direct suction toward the upper attachment roll 410 to suppress the upper attachment roll 410 from sagging. Further, the suction part 470 may be provided at both sides of an upper portion of a lower attachment roll 420 and direct suction toward the lower attachment roll 420 to suppress the lower attachment roll 420 from sagging.

However, in order to prevent a process of attaching the optical film F onto one surface of the panel P by using the upper attachment roll 410 and the lower attachment roll 420 from being disrupted, the suction part 470 may be provided at the upper side of the upper attachment roll 410 and a support part 450 may be provided in the lower attachment roll 420, thereby suppressing the upper attachment roll 410 and the lower attachment roll 420 from sagging.

The suction part 470 may include a pressure adjusting means (not illustrated) which adjusts suction pressure, and the plurality of suction parts 470 may be provided at the upper side of the upper attachment roll 410. The plurality of suction parts 470 may be provided at the upper side of the upper attachment roll 410 in a longitudinal direction of the upper attachment roll 410, and a size of suction pressure of the suction part 470 for the upper attachment roll 410 may be different according to a provided position. A center portion of the upper attachment roll 410 sags more than both side portions of the upper attachment roll 410 due to weight, so that the suction part 470 provided at the upper side of the center portion of the upper attachment roll 410 may suction and pull up the upper attachment roll 410 with larger suction pressure than that of the suction parts 470 provided at the upper sides of both side portions of the upper attachment roll 410.

A pressure adjusting means included in the suction part 470 may be connected with a detecting unit 460 and driven. The detecting unit 460 measures whether the upper attachment roll 410 sags and the degree of sagging, and sagging information of the upper attachment roll 410 measured by the detecting unit 460 is transmitted to a control unit (not illustrated). The control unit calculates an amount of suction pressure of the suction part 470 based on the sagging information of the upper attachment roll 410 transmitted from the detecting unit 460. The information on the suction pressure calculated by the control unit is transmitted to the pressure adjusting means of the suction part 470, and the pressure adjusting means may drive the suction part 470 so that the upper attachment roll 410 becomes horizontal in a longitudinal direction by using the received information.

The sagging suppressing unit may include a distance adjusting unit 480 which adjusts a distance between the suction part 470 and the upper attachment roll 410. The size of suction pressure of the suction part 470 is adjusted and a distance between the suction part 470 and the upper attachment roll 410 is also adjusted through the distance adjusting unit 480, thereby allowing the upper attachment roll 410 to be precisely horizontal in the longitudinal direction of the upper attachment roll 410.

The sagging suppressing unit according to another exemplary embodiment of the present invention may include a support part which is in contact with a part of an outer peripheral surface of the attachment roll and supports the attachment roll.

The suction part 470 may be driven so that the amount of suction pressure applied to the upper attachment roll 410 by the suction part 470 is the same as the amount of gravity applied to the upper attachment roll 410. However, the adjustment of the amount of suction pressure applied to the upper attachment roll 410 by the suction part 470 to be exactly the same as the amount of gravity applied to the upper attachment roll 410 may not be easy due to equipment tolerance, manufacturing tolerance, and the like. Accordingly, the amount of suction pressure applied to the upper attachment roll 410 may be adjusted to be slightly larger than the amount of gravity applied to the upper attachment roll 410.

However, when the amount of suction pressure applied to the upper attachment roll 410 is larger than the amount of gravity applied to the upper attachment roll 410, the upper attachment roll 410 may be bent toward the suction part 470 relative to a horizontal line, but the support part 440 formed in the form of the roll is in contact with the part of the outer peripheral surface of the upper attachment roll 410 and supports the upper side of the upper attachment roll 410, thereby suppressing the upper attachment roll 410 from being bent toward the suction part 470. Further, the support part 440 is rotatable, so that the support part 440 may support the upper attachment roll 410 without disrupting the upper attachment roll 410 which rotates during the process of attaching the optical film F to the panel P. The support part 440 may be rotated along with the rotation of the upper attachment roll 410, and the support part 440 itself may be individually rotated by providing a separate driving unit.

Further, the support part 450 supports a lower side of the lower attachment roll 420, thereby preventing the lower attachment roll 420 from sagging.

According to another exemplary embodiment of the present invention, the attachment roll may be suppressed from sagging through the suction part 470 and the support parts 440 and 450, so that it is possible to attach the optical film F onto one surface of the panel P by using the attachment roll having a diameter of 20 to 80 mm. Accordingly, it is possible to effectively suppress a defect of the manufactured display unit by improving precision of the attachment of the optical film F to the panel P.

By the suction part 470 and the support parts 440 and 450 according to another exemplary embodiment of the present invention, it is possible to manufacture a supersized display unit by attaching a optical film sheet piece F1 onto one surface of the large-area panel P without the sagging of the pair of attachment rolls having a length of 1,800 to 3,700 mm.

The description of the present invention is illustrative, and it may be understood that those skilled in the art may easily modify the present invention into other particular forms without changing the technical spirit or the essential characteristic of the present invention. Thus, it is to be appreciated that embodiments described above are intended to be illustrative in every sense, and not restrictive. For example, each constituent element described in a singular form may be distributed and carried out, and similarly, constituent elements described in a distributed form may be carried out in a combination form.

The scope of the present invention is represented by the claims to be described below rather than the detailed description, and it shall be interpreted that the meaning and scope of the claims and all the changes or modified forms derived from the equivalents thereof belong to the scope of the present invention.

What is claimed is:

1. A system for manufacturing a display unit, which attaches an optical film to a panel, the system comprising:
   a carrying unit which carries the optical film including a polarizing film;
   a cutting unit which cuts the optical film to a size corresponding to a size of the panel; and
   an attachment unit which attaches the optical film to the panel,
   wherein the attachment unit includes:
   an attachment roll which presses and attaches the optical film onto one surface of the panel; and
   a sagging suppressing unit which suppresses the attachment roll from sagging.

2. The system of claim 1, wherein the sagging suppressing unit includes a magnetic force generating unit which suppresses the attachment roll from sagging by using magnetic force.

3. The system of claim 2, wherein the magnetic force generating unit includes a permanent magnet having an intensity of 20 to 50 MGOe.

4. The system of claim 2, wherein the magnetic force generating unit includes an electromagnet, of which magnetic force is adjusted by adjusting an amount of an applied current.

5. The system of claim 2, wherein the magnetic force generating unit includes a plurality of magnetic force generating units which are disposed while being spaced apart from one another in a longitudinal direction of the attachment roll.

6. The system of claim 1, wherein the sagging suppressing unit includes a support part which is in contact with a part of an outer peripheral surface of the attachment roll and supports the attachment roll.

7. The system of claim 2, wherein the sagging suppressing unit adjusts a distance between the magnetic force generating unit and the attachment roll.

8. The system of claim 1, wherein a diameter of the attachment roll is 20 to 80 mm.

9. The system of claim 1, wherein a length of the attachment roll is 1,800 to 3,700 mm.

10. The system of claim 2, wherein the magnetic force generating unit is in contact with a part of an outer peripheral surface of the attachment roll and is in the form of a roll which is capable of supporting the attachment roll.

11. The system of claim 2, wherein the attachment roll includes a ferromagnetic substance at a position facing the magnetic force generating unit.

12. The system of claim 1, wherein the sagging suppressing unit directs suction toward the attachment roll and suppresses the attachment roll from sagging by using suction force.

* * * * *